United States Patent
Stoeger

(10) Patent No.: US 9,484,849 B2
(45) Date of Patent: Nov. 1, 2016

(54) SENSORLESS BEMF MEASUREMENT IN CURRENT-CONTROLLED BRUSHLESS MOTORS

(71) Applicant: CONTINENTAL AUTOMOTIVE GMBH, Hannover (DE)

(72) Inventor: Christian Stoeger, Vienna (AT)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/722,349

(22) Filed: May 27, 2015

(65) Prior Publication Data

US 2015/0349686 A1    Dec. 3, 2015

(30) Foreign Application Priority Data

May 27, 2014    (DE) .......... 10 2014 210 069

(51) Int. Cl.
| | | |
|---|---|---|
| *H02P 6/18* | (2016.01) | |
| *H02P 8/34* | (2006.01) | |
| *B60Q 1/076* | (2006.01) | |
| *B60Q 11/00* | (2006.01) | |
| *H02P 29/02* | (2016.01) | |

(52) U.S. Cl.
CPC ............ *H02P 8/34* (2013.01); *B60Q 1/076* (2013.01); *B60Q 11/00* (2013.01); *H02P 6/182* (2013.01); *H02P 29/024* (2013.01)

(58) Field of Classification Search
CPC ............................. H02P 25/12; H02P 6/182
USPC ............ 318/400.32, 400.01, 400.14, 400.15, 318/700, 701, 721, 799, 430, 432, 599, 811, 318/400.34; 388/800, 901, 909, 910, 928.1
See application file for complete search history.

(56) References Cited

U.S. PATENT DOCUMENTS

| | | | | |
|---|---|---|---|---|
| 4,928,043 A | * | 5/1990 | Plunkett ................. | H02P 6/182 318/400.11 |
| 5,534,763 A | * | 7/1996 | Williams ................ | H02P 6/085 318/400.13 |
| 7,141,949 B2 | * | 11/2006 | Harwood ................ | H02P 6/182 318/400.35 |
| 7,477,034 B2 | * | 1/2009 | MacKay ................. | H02P 6/182 318/254.1 |
| 2012/0304914 A1 | | 12/2012 | Russ | |
| 2013/0221894 A1 | | 8/2013 | Larsson et al. | |
| 2013/0234640 A1 | * | 9/2013 | Bateman ................ | H02P 6/182 318/400.35 |
| 2014/0145612 A1 | * | 5/2014 | Takagaki ............... | B60Q 1/085 315/82 |

FOREIGN PATENT DOCUMENTS

| | | |
|---|---|---|
| DE | 3335420 A1 | 4/1985 |
| DE | 102011000569 A1 | 5/2012 |
| DE | 102012104541 A1 | 12/2012 |

\* cited by examiner

*Primary Examiner* — Antony M Paul
(74) *Attorney, Agent, or Firm* — Laurence A. Greenberg; Werner H. Stemer; Ralph E. Locher

(57) ABSTRACT

A method for determining a reserve torque in an electronically-switched drive mechanism, specifically a pulse motor for a headlamp beam adjustment system, based upon a parameter in an essentially linear relationship to a back electromotive force of the drive mechanism. Whereby, for the determination of the back electromotive force-related parameter, the variation in the drive current is determined in relation to a change interval.

5 Claims, 3 Drawing Sheets

SENSORLESS BEMF MEASUREMENT IN CURRENT-CONTROLLED BRUSHLESS MOTORS

CROSS-REFERENCE TO RELATED APPLICATION

This application claims the priority, under 35 U.S.C. §119, of German application DE 10 2014 210 069.0, filed May 27, 2014; the prior application is herewith incorporated by reference in its entirety.

BACKGROUND OF THE INVENTION

Field of the Invention

The invention relates to a method for the determination of a reserve torque in an electronically-switched drive mechanism, specifically a pulse motor for a headlamp beam adjustment system, based upon a parameter in an essentially linear relationship to a back electromotive force of the drive mechanism.

Electronically-switched drive mechanisms, also described as "Brushless DC Motors" or "BLDCs", in various forms of embodiment are known from the prior art, whereby drive mechanisms of this type are used in the automobile industry for various applications, for example in headlamp beam adjustment systems, e.g. as pulse motors.

A pulse motor of this type is described in published, non-prosecuted German patent application DE 10 2012 104 541 A1, corresponding to U.S. patent publication No. 2012/0304914. The pulse motor contains a first conductive core, the ends of which are gapped in relation to each other, and a second conductive core, the ends of which are also mutually gapped. The conductive cores are generally configured in a C shape, and arranged at right-angles to each other, such that the first core ends are adjacent to the second core ends. The conductive cores are both comprised of a magnetic material, for the conduction of a magnetic field. The pulse motor also contains a permanent magnet, which is arranged between the core ends. The permanent magnet is mounted on a rotatable rotor shaft. In addition, a first induction coil is wound around at least one part of the first conductive core, and a second induction coil is wound around at least one part of the second conductive core. The first induction coil is provided with a first set of supply conductors, and the second induction coil is provided with a second set of supply conductors. The first and second supply conductors are electrically connected to a programmable control system, which is electrically connected to a power source for the supply of electric current to the first and second induction coils. The first and second conductive cores may be magnetized accordingly. In service, the control circuit selectively delivers a voltage to the first and second supply conductors, such that an electric current flows in the first and second induction coils respectively. In case of a change in the electric current, a magnetic field is induced in the associated induction coil. The magnetic field is then channeled through the connected conductive core towards the permanent magnet. If the magnetic field of the magnetized conductive core and the magnetic field of the permanent magnet are not in alignment, the permanent magnet will rotate around the axis of the rotor shaft. In order to maintain the rotation of the permanent magnet, the magnetic field of the first and second induction coils is altered accordingly by the application of a sequence of current signals. The speed of rotation can then be controlled by adjusting the magnitude of the voltage or current applied to the first and second supply conductors, and by the synchronized adjustment of the voltages or current.

A method for the detection of a stalled state of the pulse motor is also known, e.g. from published, non-prosecuted German patent application DE 10 2012 104 541 A1, wherein the "back electromotive force" (or "back-EMF") of the induction coils is measured. Where the control system excites one of the induction coils, and the other induction coil is de-excited, the rotation of the permanent magnet induces a voltage in the de-excited coil. This voltage is the back-EMF, and can be measured by the control system. A substantial reading for back-EMF indicates that the permanent magnet is rotating and, accordingly, that the pulse motor is not in the stalled state. Conversely, a low reading for back-EMF indicates that the permanent magnet is stationary and, accordingly, that the pulse motor is in the stalled state. In a method applied to determine whether the pulse motor is in the stalled state, the pulse motor is rotated in one direction until it reaches a limit stop, during which time the back-EMF is monitored by the control system. Immediately the back-EMF falls below a predetermined threshold, the control system rotates the pulse motor back in the other direction, while again monitoring the back-EMF, until a second limit stop is reached, at which the back-EMF again falls below a predetermined threshold. This reference procedure is generally described as a "reference run".

This method is specifically disadvantageous, in that the change in the back-EMF in the critical range is small, such that the known method only permits the achievement of maximum torque to be evaluated with limited accuracy. It is also disadvantageous that the threshold applied for stall detection is dependent upon the load. It has also been observed that, as a result of vibrations in the motor, the back-EMF may remain above the threshold, such that the stalled state cannot be reliably anticipated.

In the automobile industry, pulse motors of the type described above are used e.g. in headlight beam adjustment systems. It may be observed that the luminous intensity of available headlights increases from generation to generation.

Accordingly, it is necessary to ensure that headlights are not left in a position in which oncoming traffic—the density of which continues to rise as vehicle numbers increase—will be blinded, startled and/or dazzled. The blinding of oncoming traffic increases accident risk.

In order to resolve this problem, the prior art has already described how, in generic drive mechanisms, the point of maximum back-EMF relative to the maximum drive current indicates the reserve torque of the drive mechanism. By this method, it is possible to conduct a diagnosis of the mechanical system of the drive mechanism, and any points of sluggishness can be gauged. To this end, torque characteristic curves can be recorded, the movement of which over time constitutes a measure of wear in the mechanical system.

By the early detection of signs of wear in the motor or in the headlight, headlights can be switched to a safe condition prior to the complete loss of function, thereby reducing the dazzling of oncoming traffic and minimizing the accident risk. In other applications, it is also necessary to determine the reserve torque of the electrically-switched drive mechanism as accurately as possible.

To this end, the prior art provides for the determination of the back-EMF at the zero-crossing of the drive current, at the point where the voltage drop associated with ohmic resistance disappears. This arrangement should ensure that the measurement of the back-EMF does not impair the control of the motor.

Disadvantageously, however, this method has proven to be of limited robustness. Moreover, the measurement of the back-EMF at the zero-crossing of the drive current has the disadvantage that this method cannot normally determine the amplitude of the back-EMF, as this variable coincides with no-load conditions, but not with on-load conditions at the zero-crossing of the drive current. Consequently, a determination of the reserve torque with greater accuracy is not possible.

SUMMARY OF THE INVENTION

Accordingly, the object of the present invention is the elimination, or at least the reduction, of the disadvantages of the prior art. The specific objective of the invention is therefore the in-service detection of the back-EMF in the electrically-switched drive mechanism with limited expenditure, in order to permit an accurate determination of the reserve torque.

According to the invention, for the determination of the back-electromotive force-related parameter, the variation in the drive current is determined in relation to a change interval.

By this method, the back-EMF-proportionate parameter is obtained by the determination of the variation in the drive current in relation to the change interval, whereby the current variation is predetermined and the time interval is measured. In this method, the in-service time-related variation in the drive current is determined at least once, and may be dictated by an appropriate control unit, e.g. a microcontroller, in the form of a series of sequential, and specifically incremental current signals. Advantageously, the back-EMF can therefore be determined at any time, and not only at the zero-crossing of the drive current. This has the specific advantage that it permits the determination of the maximum back-EMF, which only coincides with the zero-crossing of the drive current in the no-load operating state but which, in the on-load state, is displaced to the phase opposite the drive current. Accordingly, the reserve torque, i.e. the maximum torque available from the drive mechanism, can be accurately determined for the application concerned. By the method according to the invention, the reserve torque can be determined with a high degree of sensitivity, even close to the full workload. This method has specific advantages for application in headlight beam adjustment systems for motor vehicles. By the determination of the back-EMF on the basis of the time-related current variation, a stalling of the drive mechanism can be reliably anticipated, thereby providing sufficient time for the headlights to be brought to a safe condition.

In a specifically preferred form of embodiment, it is provided that the back electromotive force-related parameter is determined from the change interval for a predetermined current variation, whereby the change interval is determined by the summation of time measurements with a specific degree of resolution. As variations in the drive current are dictated by the control unit, and are known accordingly, the back-EMF-proportionate parameter can specifically be determined by the recording of the variation time between sequential steps in the drive current, i.e. during incremental switching. To this end, a time measurement with a specific degree of resolution is undertaken, whereby the variation or transition time is obtained by summation.

For the detection of the reserve torque, it is advantageous if the parameter is determined for each current variation applied to the drive mechanism. Accordingly, in this form of embodiment, the back-EMF-proportionate parameter is determined continuously for each switching step (or switching block, or switching stage) in the drive current. Advantageously, it is therefore possible to determine a maximum or minimum back-EMF, regardless of load conditions.

For the determination of the reserve torque of the drive mechanism, it is advantageous if a phase displacement of the parameter in relation to the drive current is determined. To this end, the phase angle of the minimum and/or maximum value for the parameter relative to the minimum or maximum drive current is specifically determined, from which, as is known from the prior art, it is possible to deduce the reserve torque.

As the back-EMF reflects the instantaneous angular velocity of the drive rotor, the back-EMF may be advantageously exploited as a means of detecting mechanical oscillations in the system caused by wear-out or production-related dusts. By the method according to the invention, the back-EMF can be determined in routine operation, in order to detect wear in the mechanical system of the drive mechanism. To this end, it is advantageous if a characteristic curve for the parameter is determined for a position of the drive mechanism. By the recording of variations in the characteristic curve during routine operation, it is possible for wear to be deduced.

Other features which are considered as characteristic for the invention are set forth in the appended claims.

Although the invention is illustrated and described herein as embodied in a sensorless BEMF measurement in current-controlled brushless motors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
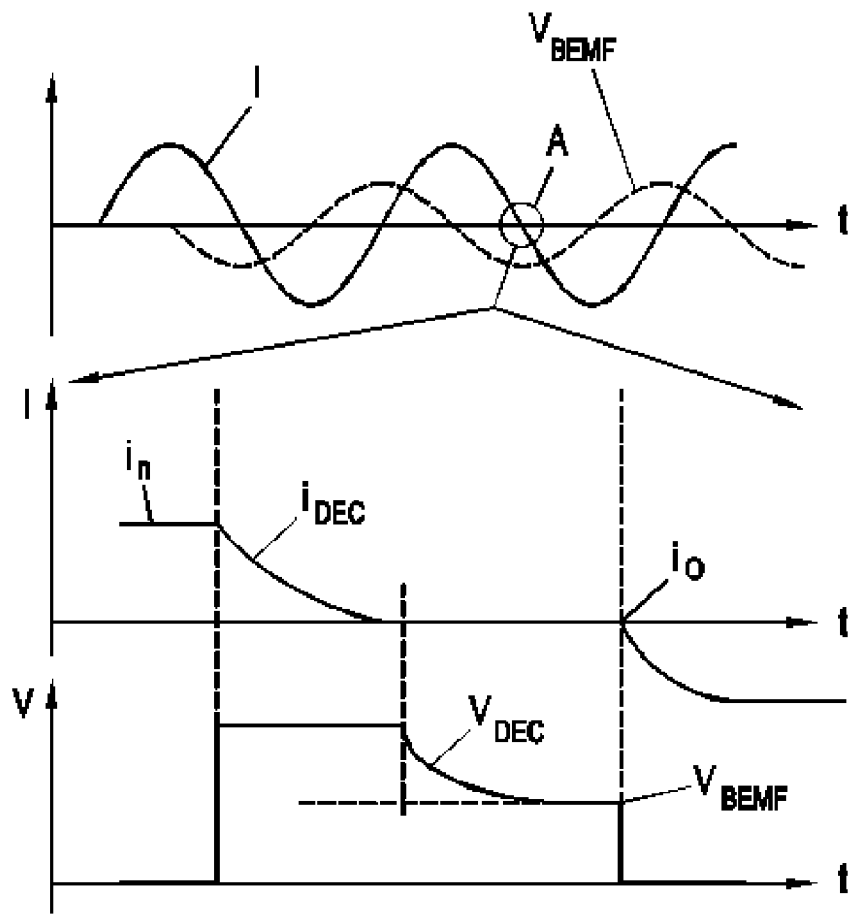
FIG. 1 is a graph showing a current-time characteristic for a pulse motor, in which a back-EMF is determined by a method which is known from the prior art, at the zero-crossing of the drive current.

Referring now to the figures of the drawings in detail and first, particularly to FIG. 1 thereof, there is shown a diagram in which the solid line represents a drive current I during an operation of a non-illustrated pulse motor. The drive motor may be configured e.g. in accordance with published, non-prosecuted German patent application DE 10 2012 104 541 A1. As the design and control of such pulse motors are sufficiently well known in the prior art, reference may be made for this purpose to the disclosure of DE 10 2012 104 541 A1. In the operation of pulse motors of this type (or other electronically-switched drive mechanisms) by the application of a drive current, the back electromotive force, or back-EMF, also abbreviated to BEMF, runs counter to the control mechanism. This results in a loss of torque, which is directly proportional to the speed of rotation.

In FIG. 1, the dashed line represents the back electromotive force (VBEMF) which results from the movement of the drive rotor in the magnetic field of the stator. According to the prior art, the back electromotive force, hereinafter abbreviated to back-EMF, is determined at the zero-crossing of the drive current I.

The lower part of FIG. 1 shows a detailed enlargement, from "A", of the drive current I characteristic in the vicinity of the zero-crossing. Accordingly, in response to a corresponding instruction delivered by a control unit (not represented), the drive current i is reduced from a step value $i_n$ to a step value $i_0$, which corresponds to the zero-crossing of the drive current. In the transition from step value in to the zero-crossing $i_0$, the drive current observes a current decay characteristic $i_{DEC}$. FIG. 1 also represents the drive voltage characteristic V, which is comprised of the operating voltage $U_B$ and the back-EMF. At the zero-crossing of the drive current I, the drive voltage V falls, with a time delay in relation to the drive current I and observing a voltage decay characteristic $V_{DEC}$, to a value $V_{BEMF}$ which corresponds to the back-EMF. Disadvantageously, however, the back-EMF will only achieve its maximum at this point in time if the drive mechanism is not delivering any torque (no-load state). In the on-load state of the drive mechanism, the drive current will run ahead of the back-EMF, such that the measured back-EMF will be smaller than the maximum value or amplitude thereof.

The back-EMF may be used for the detection of stalling in the drive mechanism, where the load torque exceeds the maximum torque of the drive mechanism (stall detection). However, by the method represented in FIG. 1, stall detection can only be executed under specific marginal conditions and, in practice, has also shown limited reliability. Stall detection may be used, for example, in vehicle headlights, the beam adjustment system of which is not provided with a zero-point sensor. To this end, a reference run to a limit stop is completed in the first instance, and a specific number of steps are then executed for the alignment of the headlight. Disadvantageously, stepping losses or the stalling of motors for mechanical reasons may result in the dazzling of oncoming traffic, and will constitute an accident risk as a result.

Figure 2:
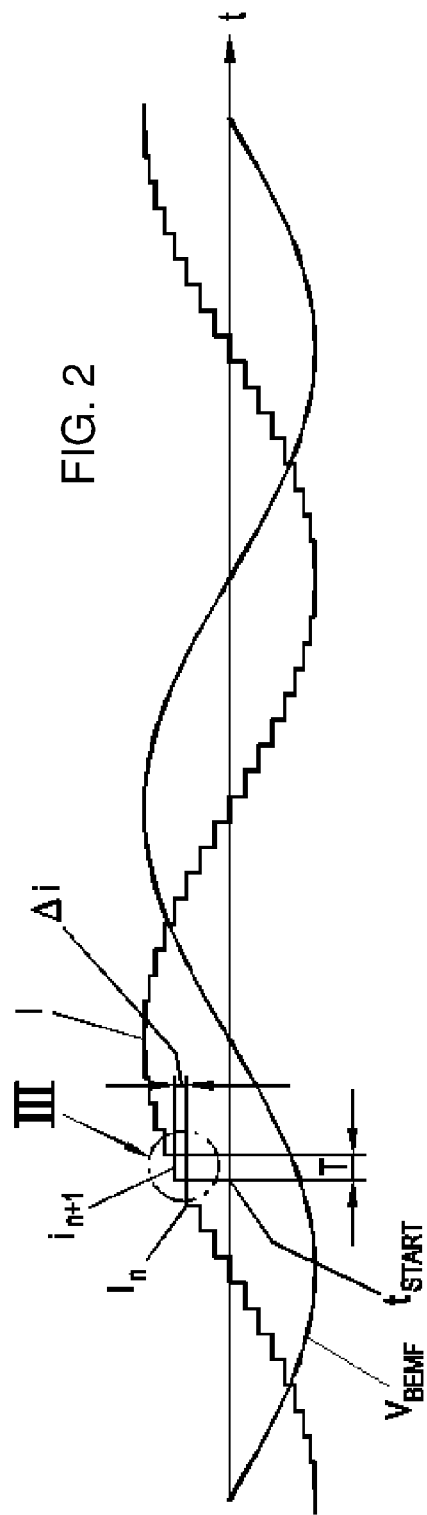
FIG. 2 is a graph showing a current-time characteristic for the pulse motor in which, according to the invention, a variation in a drive current in relation to a change interval is determined to determine a back electromotive force-proportionate parameter.

Conversely, FIG. 2 represents a method for the continuous determination of the back-EMF which provides a reliable forecast for a stalling of the drive mechanism, based upon the back-EMF.

The back-EMF may be calculated from equations (1) and (2), and overall from equation (3), whereby equation (2) describes the linear approximation of equation (1).

$$V = L \cdot di/dt \quad (1)$$

$$V = L \cdot \Delta i/\Delta t \quad (2)$$

$$V_{BEMF} = L \cdot \Delta i/\Delta t - U_B \quad (3)$$

V represents the voltage in the coil of the drive mechanism, L represents inductance, di/dt or $\Delta i/\Delta t$ represents the variation in the drive current over time, $U_B$ represents the operating voltage, and $V_{BEMF}$ represents the back-EMF.

The back-EMF $V_{BEMF}$ is also governed by the known relationship:

$$V_{BEMF} = -N \cdot A \cdot B \cdot \omega \cdot \sin(\omega t + t_0), \quad (4)$$

where ω represents the angular velocity of the drive mechanism and N, A and B represent various proportionality factors.

From equation (4), it proceeds that the back-EMF $V_{BEMF}$ is equal to zero where the angular velocity ω=0, i.e. the drive mechanism is stalled.

Accordingly, by a time measurement during transition from a hold current to a run current, where the operating voltage $U_B$ is known, it is possible to calculate the inductance L, equation (5).

$$L = u \cdot \Delta t/\Delta i \text{ where } \Delta i = \text{run current} - \text{hold current, and}$$
$$u = U_B. \quad (5)$$

It is important that the current in all phases of the motor should rise simultaneously, in order to prevent any movement in the motor which would invalidate the assumption $U_{BEMF}=0$. Although the inductance L must be known in order to calculate the magnitude of the back-EMF (i.e. by quantitative determination), it may be omitted in the definition of the linearly-related parameter BEMF described below (which provides a qualitative representation of the back-EMF) for the determination of the reserve torque. This simplifies the method applied considerably.

In equation (3) for the back-EMF $V_{BEMF}$, the operating voltage $U_B$ may also be ignored, as it constitutes an offset variable only. Accordingly, the back-EMF $V_{BEMF}$-proportionate parameter BEMF may be obtained by equation (6) as follows:

$$BEMF = \Delta i/\Delta t \quad (6)$$

As the current variation $\Delta i = i_{n+1} - i_n$ during a switching step executed by the control unit will be known, equation (6) may be reduced to a time measurement with resolution $t_{TIC}$ (see FIG. 3) and a summation in the time interval from $t_{START}$ to $t_{END}$, in which the drive current I moves from step value in to step value $i_{n+1}$, see equation (7).

$$BEMF = \Sigma_{(tSTART)}^{(tEND)} \Delta i/t_{TIC} \quad (7)$$

The end of the time interval, or point in time $t_{END}$, is then achieved when the current value reaches $i_{n+1}$. This point in time may be recognized for example in that a current controller, which dictates the current $i_x$, assumes its regulating function. Between $t_{START}$ and $t_{END}$, the current controller will be on standby in full advance mode, until such time that the current—inhibited by the motor inductance L and the $V_{BEMF}$—finally achieves the notional value. In this case, i.e. where the current controller detects the point in time $t_{END}$, no additional current measurement is necessary. In general, it is of little consequence how the time measurement is achieved, provided that the degree of resolution in the time measurement is sufficiently large (or $t_{TIC}$ is sufficiently small) to permit at least the phase angle of BEMF to the drive current to be determined with sufficient accuracy.

Figure 3:
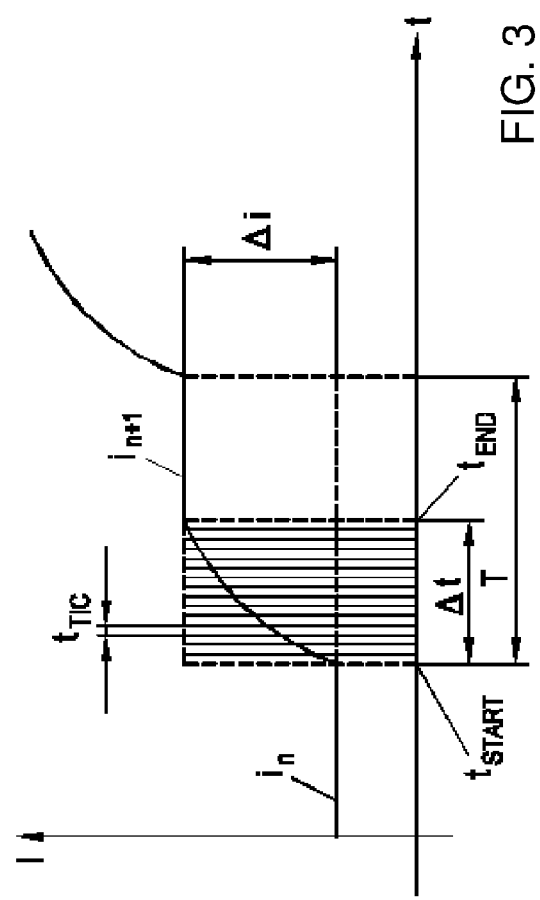
FIG. 3 is a graph showing an enlarged section of FIG. 2, corresponding to area III shown in FIG. 2.

FIG. 3 shows a schematic representation of fifteen intervals of width $t_{TIC}$, i.e. $\Delta t = 15 \times t_{TIC}$. Under normal conditions, the amplitude of current variation is set such that the point in time $t_{END}$ occurs prior to the expiry of the step interval T or prior to the point in time $t_{START}+T$. The step interval T therefore remains constant, provided that the motor speed and the control resolution are maintained constant, and therefore makes no contribution to measurement. The current variation $\Delta i$ is only dependent upon the position in the current sine curve, such that, for a selected control resolution and a selected phase angle, it will also remain constant and—as already indicated above—is known. Even if the speed is varied, Δi does not vary. The change interval Δt is therefore dependent upon the following parameters: the current variation Δi, the back-EMF $V_{BEMF}$, the inductance L and the operating voltage $U_B$. Of these, Δi (in relation to the phase angle) and L (assumed to be constant as a function of time) may be assumed to be constant. From FIG. 2, it will be seen that, at a phase angle of 45°, 135°, 225° and 315°, while both Δi and $V_{BEMF}$ remain equal in magnitude in all cases, all variations in symbol combinations will be run through. Accordingly, Δt is equal at 45° and 225°, and at 135° and 315°. With the motor under on-load conditions, the displacement of VBEMF and Δt will not generally show any symmetry. However, an interpolated sine curve may still be plotted, and a periodicity may be observed accordingly.

By the incorporation of equation (6) in equation (3), it is possible to undertake the straightforward calculation of the back-EMF $V_{BEMF}$ by equation (8). This may proceed e.g. in a microprocessor μC, whereby equation (7) represents the measurement of the parameter BEMF by equation (6). In service, it is only necessary for measured data in accordance with equation (7) to be transmitted from a pulse motor driver to the microprocessor.

$$U_{BEMF} = L \cdot BEMF - U_B \qquad (8)$$

Where the current variation Δi is assumed to be constant (i.e. in a control system in which an oscillation in the motor current is simulated on the basis of a variation in the width of the current step), the back-EMF may be determined by time measurement alone. This arrangement delivers a multitude of usable results. In this case, however, it is more important to determine whether the back-EMF varies over the cycle; in this case, the angular relationship over a cycle will no longer be linear, and will require particular consideration.

FIG. 2 and FIG. 3 represent the drive current I characteristic associated with a control of the pulse motor by electronic (block or sinusoidal) switching. Measurement of the parameter BEMF by equation (7) can then proceed continuously, where a new current value $i_{n+1}$ is applied to the drive coil. The parameter BEMF is therefore determined upon each transition between sequential current steps $i_n$, $i_{n+1}$. Accordingly, the measurement of the parameter BEMF by reference to an electric cycle in the motor will be all the more accurate, the closer the matching of the drive current to the sine curve represented in FIG. 1.

By a known relationship, the maximum available torque delivered by the drive mechanism decreases as the speed of rotation increases. It is therefore important to determine whether the speed of rotation selected for a specific application provides a sufficient degree of security in the instantaneous relationship between the drive mechanism and the load. For the determination of the reserve torque and the dynamic variation thereof associated with wear, the phase angle of the parameter BEMF may be considered.

To this end, from the continuous determination of the parameter BEMF, the maximum value thereof for the definition of the phase relationship to the drive current will be determined. Determination of the absolute value of the back-EMF is not necessary for this purpose—determination of the parameter BEMF by equation (7) will suffice. From the phase angle of the parameter BEMF relative to the drive current I, it is possible to undertake the quantitative definition of the reserve torque.

Moreover, the phase spacing between the parameter BEMF and the drive current I can be plotted and saved in a characteristic curve for the positions of the drive mechanism. In routine operation, a variation in this characteristic curve, including the consideration of temperature where applicable, can be detected, from which it will be possible to deduce the wear-out of the drive mechanism.

The maximum value for the parameter BEMF can also be used for stall detection, whereby the load-related displacement in the measured $V_{BEMF}$ value at the zero-crossing of the drive current I, by the method represented in FIG. 1, can be eliminated, thereby permitting a reliable diagnosis to be undertaken.

This method will only be robust if the current $i_{n+1}$ is achieved in the available time, i.e. within the time interval before $i_{n+2}$ is targeted. To this end, an indication is required which can be easily read from the current control unit (e.g. the switching performance of a switching controller or the achievement of a current value). If the current $i_{n+1}$ is not achieved, it will not be possible to determine parameter BEMF with any validity. There are a number of reasons for this—commonly, the speed of rotation of the motor or the selection of the motor are inappropriate for the application concerned.

Figure 4:
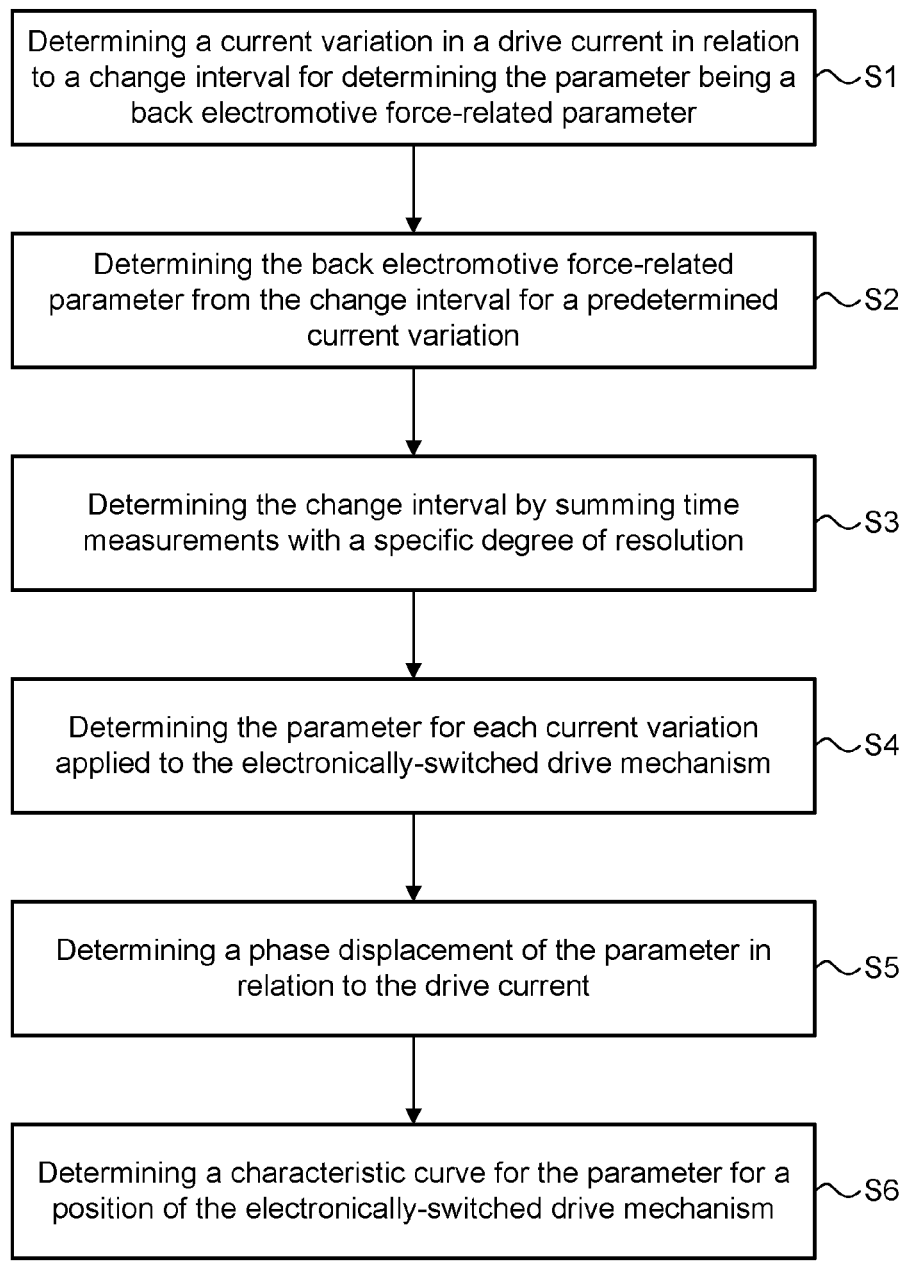
FIG. 4 is a flow chart showing the steps corresponding to the claimed method.

FIG. 4 is a flow chart showing the steps corresponding to the claimed method for determining a reserve torque in an electronically-switched drive mechanism based upon a parameter in a generally linear relationship to a back electromotive force of the electronically-switched drive mechanism. Step S1 is determining a current variation in a drive current in relation to a change interval for determining the parameter being a back electromotive force-related parameter. Step S2 is determining the back electromotive force-related parameter from the change interval for a predetermined current variation. Step S3 is determining the change interval by summing time measurements with a specific degree of resolution. Step S4 is determining the parameter for each said current variation applied to the electronically-switched drive mechanism. Step S5 is determining a phase displacement of the parameter in relation to the drive current. Step S6 is determining a characteristic curve for the parameter for a position of the electronically-switched drive mechanism.

The invention claimed is:

1. A method for determining a reserve torque in an electronically-switched drive mechanism based upon a parameter in a generally linear relationship to a back electromotive force of the electronically-switched drive mechanism, which comprises the steps of:
   determining a current variation in a drive current in relation to a change interval for determining the parameter being a back electromotive force-related parameter;
   determining the back electromotive force-related parameter from the change interval for a predetermined current variation; and
   determining the change interval by summing time measurements with a specific degree of resolution.

2. The method according to claim 1, which further comprises determining the parameter for each said current variation applied to the electronically-switched drive mechanism.

3. The method according to claim 1, which further comprises determining a phase displacement of the parameter in relation to the drive current.

4. The method according to claim 1, which further comprises determining a characteristic curve for the parameter for a position of the electronically-switched drive mechanism.

5. The method according to claim 1, wherein the electronically-switched drive mechanism is a pulse motor for a headlamp beam adjustment system.

* * * * *